May 30, 1944.   F. LEISTER ET AL   2,350,240
SEXTANT
Filed July 9, 1941   2 Sheets-Sheet 1

INVENTORS
Fayette Leister
BY Herbert A. Leister
Mitchell Burhat
ATTORNEYS

May 30, 1944. F. LEISTER ET AL 2,350,240
SEXTANT
Filed July 9, 1941 2 Sheets-Sheet 2
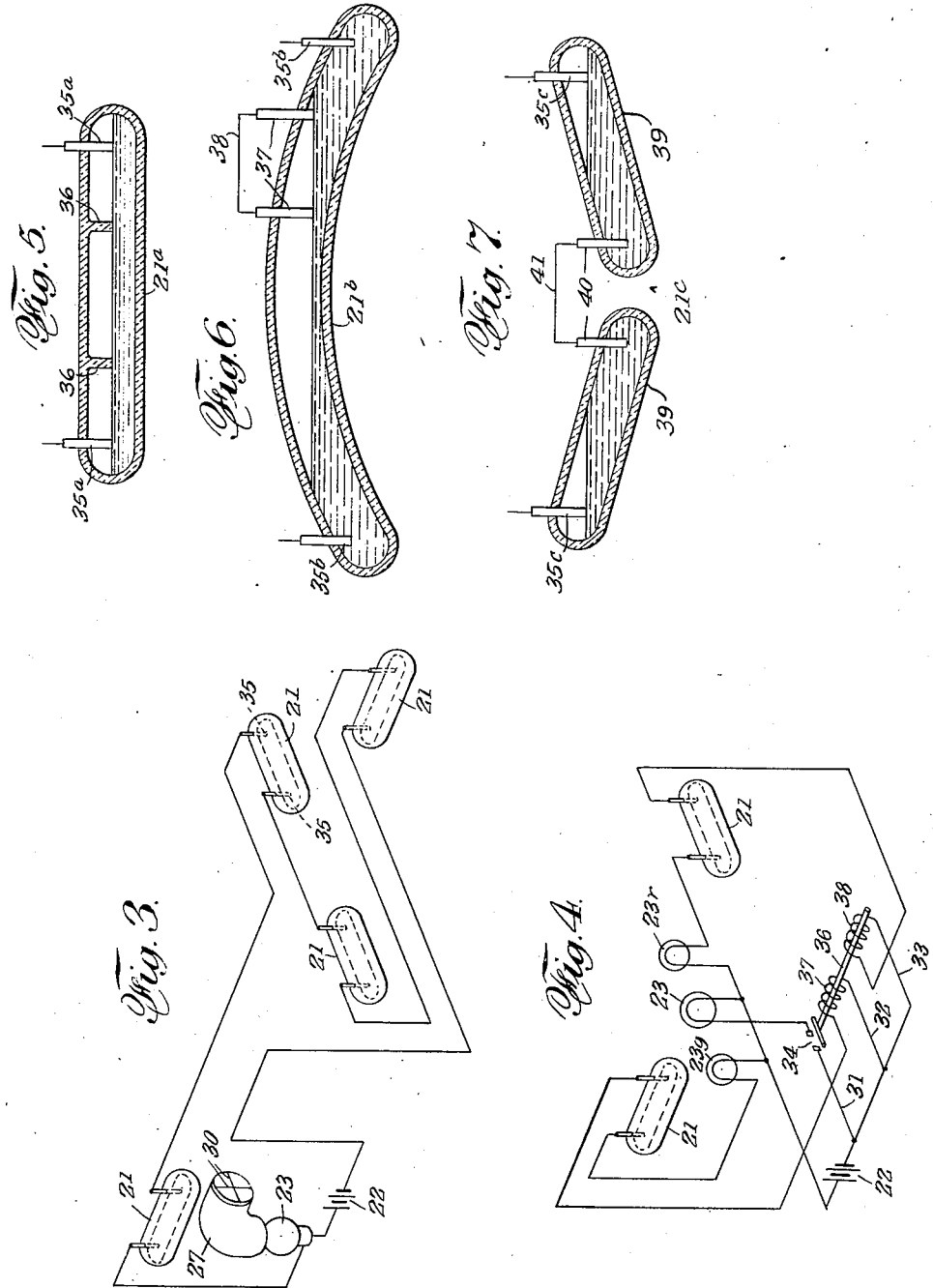

Patented May 30, 1944

2,350,240

UNITED STATES PATENT OFFICE 2,350,240

SEXTANT

Fayette Leister, Detroit, Mich., and Herbert A. Leister, Philadelphia, Pa.

Application July 9, 1941, Serial No. 401,618

7 Claims. (Cl. 88—2.2)

This invention relates to improvements in observation instruments such as sextants and the like and more particularly to instruments of this general character provided with level indicating means.

At sea the location of the observer may be obtained by measuring the angles between the horizon and a celestial body. However, if the horizon cannot be observed because the observer is so located on land that he cannot see the horizon or because he is compelled to take observations at night or when the horizon is otherwise obscured, it has been an established practice to use an artificial horizon consisting of a covered basin of mercury or a carefully leveled reflector, in each case mounted on a stationary support. However, such artificial horizons cannot be used satisfactorily on flying aircraft or ships at sea.

The main object of the present invention is to provide a novel and advantageous instrument whereby the altitudes of stars and the like can be measured with considerable accuracy from aircraft and ships without seeing the horizon.

Another object is to provide a novel and advantageous sextant equipped with means to display a signal in the line of sight of the sextant when the sextant is level.

Another object is to produce a novel and advantageous sextant with means to display a signal visible through the eye-piece indicating that the sextant is level.

A further object is to provide improved leveling devices for use with sextants and the like.

The present invention utilizes the principle that if the observer directs the line of sight through the eye-piece to a signal at the same level as the eye-piece and at the same time has the instrument leveled, he will have a good base from which the angular altitude of a star or the sun may be measured. It will be evident that the accuracy of the longitudinal leveling is more important than the transverse leveling.

According to one embodiment of the invention, the instrument may be provided with a light signal in the line of sight of the sextant and means for illuminating said light signal when the sextant is leveled. If desired there may be provided signals indicating separately either that the sextant is level along the line of sight or transversely thereof. While the instrument is in leveled condition, the index arm may be shifted to reflect the image of the observed object to the eye-piece and the arm may then be clamped to the frame to enable the instrument to be moved to a convenient location before determining the reading.

By use of an instrument embodying the present invention, a navigator may use any celestial body regardless of the visibility of the horizon. This is very advantageous for the observation of such in that it is not limited to a relatively short interval, as that of twilight, during which the stars and planets have begun to show while the horizon is still clearly visible. If depending upon sighting the horizon, the navigator cannot wait until a star reaches a desired bearing but must use the short period which is available for his observations. With the present device the observer can use any stellar body regardless of the horizon. Few devices for the general purpose of this invention exist and such devices are in general very complicated and not too accurate. When one realizes that the best navies in the world, the air corps, and others have struggled with the problems and now use only various bubble developments, it is evident that the present invention provides a solution of a difficult and highly important problem.

Other objects, features and advantages will appear upon consideration of the following detailed description and illustrative drawings, in which—

Fig. 3 is a diagrammatic view of the system of Fig. 1, including leveling means and the signal controlled thereby;

Fig. 4 is a diagrammatic view of another form of leveling and signaling system;

Fig. 5 is a sectional view of a second form of electrical leveling switch adapted for use in the systems illustrated in Figs. 3 and 4;

Fig. 6 is a sectional view of another electrical leveling switch adapted for use in the systems of Figs. 3 and 4; and Fig. 7 is a sectional view of another form of switch.

Figure 1:
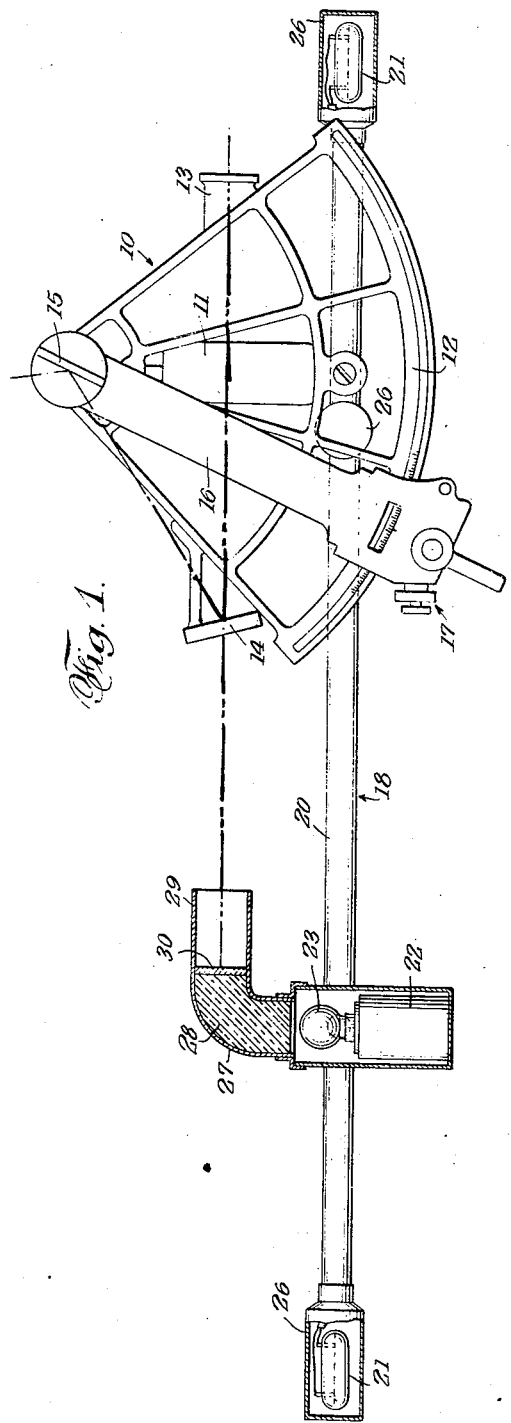
Fig. 1 is a side elevation of an instrument embodying one form of the invention.

Referring to the drawings, there is shown for the purpose of illustration a sextant having a main frame 10 including a handle 11 and a graduated measuring arc or limb 12, an eye-piece 13, a horizon glass 14 of which the upper part is clear and the lower part is silvered, and an index glass or half mirror 15 mounted upon an index arm pivoted to swing about an axis at the reflecting surface of the index glass. The other end of the index arm 16 is movable along the arc 12 and its angular position may be determined by means of an adjusting and measuring device 17 illustrated as including a micrometer, but which might be any other suitable device such as a vernier. The horizon glass 14 is so inclined to the line of sight of the eye-piece that light reflected from the index glass 15 to the lower part of the horizon glass 14 will be reflected to the eye-piece. For simplicity, the usual light screens of different degrees of opacity have been omitted from the drawings.

Thus far, the description applies generally to usual types of sextants which may be used to determine the altitude of objects above the horizon by looking through the eye-piece 13 and the upper or clear portion of the horizon glass, at the horizon when that is visible, and then, while the sextant is in substantially vertical position, shifting the index arm 16 to position the index glass to reflect light from the observed object to the lower half of the horizon glass 14 from which the light will again be reflected through eye-piece 13 to the eye of the observer.

To obtain a good measurement between the line of sight of the eye-piece 13 and the line of sight from the eye-piece to the object being observed, the index arm is shifted to bring the image on the lower half of the horizon glass 14 to the line of division between the mirror section and the clear section of such horizon glass. The angle between the mirrors is only one-half the angle between the line of sight through the eye-piece and the line of sight from the eye-piece to the object being observed and the ordinary sextant has its limb 12 marked with an index graduated to show twice the angle through which the index arm 16 is shifted.

In the event that the horizon be obscured, for example when the sextant is being used on land, it has been customary in the past to use with the sextant an artificial horizon consisting of a pool of mercury with glass thereover to prevent disturbance by wind or like, or of any suitably leveled mirror. These forms of artificial horizons cannot, however, be used on vessels at sea where their levels would constantly be changed in accordance with the movement of the vessels or on moving aircraft.

Figure 2:
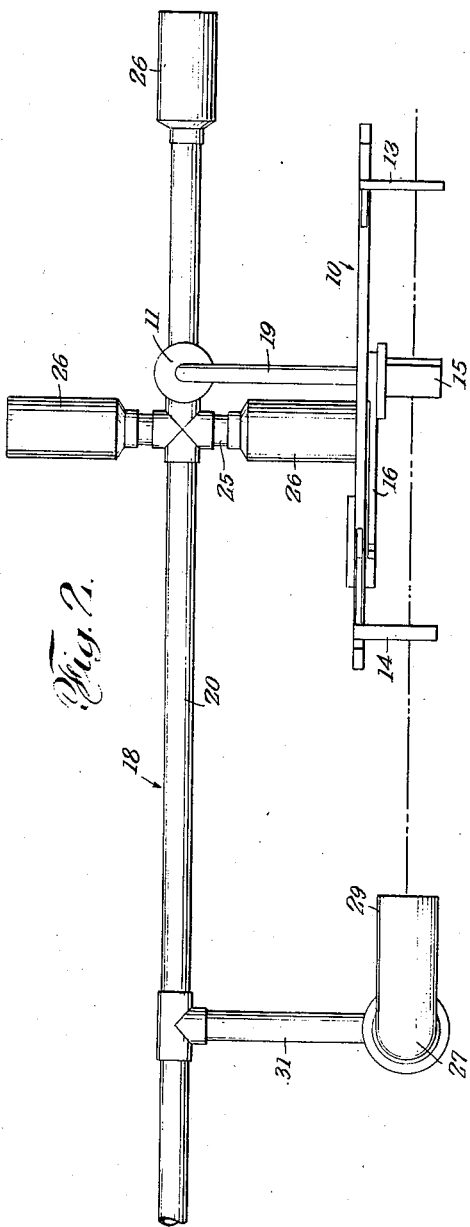
Fig. 2 is a top plan view of the instrument shown in Fig. 1.

According to the present invention, no attempt is made to get a reflected image of the observed object by use of an artificial horizon but the sextant is leveled by means which includes a sight signal on the line of sight through the eye-piece, the signal being rendered effective when the instrument is leveled. As illustrated in Figs. 1 and 2, a leveling and switching attachment 18 may be supported from the sextant frame by attachment to the lower end of the handle 11 which, in order to prevent interference between different parts, may be offset to the rear (Fig. 1) of the frame 10 by use of a suitable connection 19.

The device 18 comprises a longitudinal frame member or tube 20 fastened to handle 11. At suitably spaced positions therealong member 20 is provided with longitudinally arranged leveling devices, such as leveling mercury switches 21 in a circuit containing a battery 22 and a lamp 23 in a suitable casing. As illustrated in Figs. 1 and 3, each of these devices or switches 21 includes an elongated tube partly filled with mercury or other conducting liquid and terminals extending downwardly into the tube so that when the tube is level the switch will be closed and when the tube is tilted longitudinally from its level position, the switch will be opened. It should be understood that each of the devices 21 is arranged longitudinally with respect to member 20. Spaced transversely of member 20 are transversely arranged leveling mercury switches 21 (Fig. 3) and they are preferably carried by arms 25 extending horizontally in opposite directions from the member 20. Preferably each of the switches 21 is enclosed in a casing 26. The leveling mercury switches 21 are so-called because each of them closes only when level.

It will be seen that, when the frame comprising the member 20 and the transversely extending arms 25 is level, all of the switches will be closed and the lamp 23 will be lighted. In order to have the frame, consisting of the member 20 and the arms 25, where it will not interfere with the observer, it is positioned beneath the sextant proper. The lamp 23 is thus beneath the line of sight through the horizon glass 14 and the eye-piece 13. In order to show the light signal in the line of sight of the sextant, there may be provided above the lamp a curved tube 27 enclosing a body 28 of suitable light-transmitting material, such as "Lucite," so that the light thrown upwardly from the lamp will be diffused and turned to a horizontal direction toward the horizon glass and the eye-piece. At the surface of the "Lucite" towards the eye-piece, the tube 27 may be provided with a shield 29 and cross hairs 30 (Fig. 3), so that the line of sight may be carefully determined. It will be seen that in view of the sidewise displacement of the member 20 from the sextant proper it will be necessary to mount the battery and lamp at the end of an arm 31 (Fig. 2). In order that the sextant may be used in the usual way when conditions are suitable, the curved tube 27 may be mounted for ready removal from the lamp casing or so that it can be turned out of the line of sight through the eye-piece and the horizon glass.

Apparently one leveling mercury switch 21 arranged longitudinally of the member 20 and one leveling switch 21 arranged transversely thereof (when leveling along two axes is desired) would be sufficient to level the instrument. However, it is believed that a plurality of switches arranged in the two directions will produce better leveling in view of capillary action of the mercury which may cause a delay in the breaking of the circuit. Other factors may also affect the making and breaking of the switches. More switches or tubes will provide better chances of breaking the circuit as the device is swung through a variety of positions, in that it will be fairly certain that, if the instrument were not level, one or more of the contacts would be broken.

In operation, the instrument would be moved by the observer to a position at which all of the leveling switches would be closed, thus lighting the lamp and providing a signal to be viewed through the eye-piece and horizon glass. Then the index arm 16 would be moved to a position to reflect the observed object from the index glass and the horizon glass to the eye-piece and to position the image close to the upper edge of the mirror portion of the horizon glass. Then the arm 16 would be clamped so that the instrument could be shifted to enable reading the angle of elevation of the observed object.

With the arrangement illustrated in Figs. 1, 2 and 3, the instrument is shifted until it assumes a leveled position, thus operating to close the leveling mercury switches 21 and render the signal effective. Then the altitude of the object to be observed may be measured in the usual way by shifting the index arm 16 until the image of the body observed appears at the proper place on the half mirror of the horizon glass substantially in coincidence with the intersection of the cross hairs of the light signal.

However, it may be desirable to level first in one direction and then, while holding it level in this direction, to level the instrument in the other direction. In order to level the instrument in this way (see Fig. 4), there may be provided in addition to a signal lamp 23, a lamp 23g showing a green light when the instrument is leveled longitudinally and a lamp 23r showing a red signal when the instrument is leveled transversely. It is also proposed to light the lamp 23 when the instrument is leveled both longitudinally of the line of sight and transversely thereof. To this end, the lamps 23, 23g and 23r are connected in parallel between main conductors connected with the battery 22, by means of connections 31, 32, and 33 respectively. The connection 31 includes a switch 34 connected in series with lamp 23, this switch being normally open, but closed automatically when circuits are completed through lamps 23g and 23r. The switch 34 may normally be held open and may be controlled by armature 36 operable as a part of two solenoids, including a coil 37 in series with the longitudinally arranged leveling switch 21 and a second coil 38 in series with the transverse leveling switch 21. Neither of the solenoids is strong enough alone to close the switch 34, but when both are energized, the plunger 36 will be shifted and the switch 34 closed.

Each of the leveling switches 21 illustrated in Figs. 1 to 4 inclusive is composed of a straight tube with closed ends partially filled with a conducting fluid such as mercury, and terminals 35 projecting downwardly into the tube so that when the tube is horizontal, both terminals will contact with the mercury and complete the circuit containing the switch. Obviously, when the tube is tilted longitudinally the terminal at the higher end of the tube will be out of contact with the liquid and the switch will be opened.

It should be understood that various other forms of switches might be used in place of the switch 21. In switches such as switch 21, the mercury may be caused by back and forth movement of the switch to surge back and forth in such a way as to make and break the circuit irrespective of tilting of the tube thereof. This would be especially true for a long tube. Such movement of the mercury or the like may be avoided to a great extent by use of a tube 21a (Fig. 5) which is straight like tube 21 and has terminals 35a like terminals 35, but differs from switch 21 due to the provision of baffles 36 projecting downwardly from the top of the tube to approximately the surface of the mercury or other liquid. Obviously the baffles 36 will tend to prevent opening and closing of the switch due to movement other than longitudinal tilting.

Another form of leveling switch 21b (Fig. 6) may comprise an elongated tube with closed ends but curved so that its ends are lower than its central portion, the conducting liquid or mercury therein being normally positioned principally in the lower end portions in contact with terminals 35b. One of these terminals might be exposed if the tube were tilted longitudinally to a sufficient extent, but in the form shown this tilting would have to be very decided and too far to be of use. The leveling switches 21b may therefore be provided at an intermediate point with two or more terminals 37 in contact with the mercury when the tube is level and connected in series by suitable conductors as 38, thus making it easy to break the circuit by a slight longitudinal tilting—if one contact does not break another will.

In Fig. 7 there is shown a very effective form of switch 21c comprising two straight tubes 39, which may be rigidly connected by any suitable means (not shown) and may be arranged end to end with their adjacent ends depressed and each partly filled with a conducting fluid such as mercury. At their adjacent ends the two tubes are provided with terminals 40 which are connected electrically by a conductor 41, and at their outer ends the two tubes are provided with downwardly extending terminals 35c which are in contact with the mercury when the tubes are level. When, however, the rigidly connected tubes are tilted longitudinally, one of the outer end contacts or terminals will be separated from the mercury and the circuit will be broken.

It will be evident that, by use of instruments constructed in accordance with the present invention, accurate observation of the sun and heavenly bodies can be made regardless of the visibility of the horizon.

It should be understood that various changes may be made and that various features may be used without others (e. g. leveling along one axis only may be desired), without departing from the true spirit and scope of the invention.

We claim:

1. A sextant or like instrument comprising the combination with a frame, an eye-piece and a horizon glass mounted on said frame and providing a line of sight, and a pivotally mounted index glass, of a light signal in said line of sight and mounted on said frame and means for rendering said light signal effective when said instrument is leveled along the line of sight and transversely thereof and ineffective when not leveled, said means including an electric lamp, a lamp circuit, one or more leveling switch devices in said circuit arranged for leveling longitudinally of the line of sight and one or more leveling switch devices in said circuit arranged for leveling transversely of the line of sight, said devices being arranged in series in said lamp circuit.

2. A sextant or like instrument comprising the combination with a frame, an eye-piece and a horizon glass mounted on said frame and providing a line of sight, and a pivotally mounted index glass, of a light signal comprising a light field and cross hairs in said line of sight, and means rendered effective by leveling the instrument to illuminate said light field, including an electric lamp, a lamp circuit and one or more combined leveling and switching devices in said circuit arranged to close the lamp circuit at such devices when the instrument is leveled along said line of sight.

3. A sextant or like instrument comprising the combination with a frame, an eye-piece and a horizon glass mounted on said frame and providing a line of sight and a pivotally mounted index glass, of a light signal comprising a light field and cross hairs in said line of sight, and means rendered effective by leveling the instrument to illuminate said light field, including an electric lamp, a lamp circuit and one or more combined leveling and switching devices in said circuit arranged to close the lamp circuit at such devices when the instrument is leveled along said line of sight, such illuminating means comprising a lamp at one side of said line of sight and means for lighting said light field from said lamp.

4. A sextant or like instrument comprising the combination with a frame, an eye-piece and a horizon glass mounted on said frame and providing a line of sight, and a pivotally mounted index glass, of a light signal comprising a light field and cross hairs in said line of sight, and means rendered effective by leveling the instrument to illuminate said light field, such illuminating means comprising a vertically held lamp beneath said line of sight, means for lighting said light field from said lamp comprising a tube curved from the top of said lamp to said light field and light transmitting and diffusing means in said tube, and means for lighting said lamp when the sextant is level comprising an electric system controlled by longitudinally-leveling switches one at the front and one at the rear and transversely-leveling switches one at the right and one at the left.

5. A sextant or like instrument comprising the combination with a frame, an eye-piece and a horizon glass mounted on said frame and providing a line of sight, and a pivotally mounted index glass, of signaling means in said line of sight comprising a light field and indications for observation in determining said line of sight, and means for showing a light of one color adjacent to said field when the instrument is leveled longitudinally, a light of another color when the instrument is leveled transversely, and a light to illuminate said light field for sighting said indications from said eye-piece.

6. The combination with a sextant of the kind described, of an upright handle spaced to one side of the frame and supported from the frame, and a level-indicating device supported by said handle opposite the lower part of said frame and comprising an elongated longitudinal member parallel to the line of sight through the eye-piece and horizon glass and having its rear end near the rear end of the arc and its front end extending to the front of the front end of said arc, and a transverse member with arms projecting horizontally from opposite sides of said longitudinal member, a light source supported from said longitudinal member and having a light screen in said line of sight and with associated cross lines in said line of sight and means for supplying light from said light source to said light screen, and an electric lighting system for said light source, including longitudinal-leveling switches at the front and rear ends of said longitudinal member and transversely leveling switches at the ends of said transverse member and electrical connections through said switches to said light source whereby said switches will be closed when the sextant is level and the light source will be effective.

7. The combination with a sextant comprising a flat frame to be held vertically and having a graduated arc at the bottom thereof, an eye-piece and a horizon glass mounted on said frame and determining a line of sight and an index glass pivotally mounted at the upper part of said frame substantially at the center of said arc, of an upright handle spaced at one side of said frame and supported from the upper part of said frame, and a level-indicating device comprising an elongated longitudinal member attached to said arm opposite to the lower part of said frame parallel to said line of sight through said eye-piece and horizon glass and having its rear end near the rear end of said arc and its front end extending beyond the front end of said arc and a transverse member with arms projecting horizontally from opposite sides of said longitudinal member, a vertical lamp supported from said longitudinal member and located immediately beneath said line of sight, a signal device with a vertically arranged light screen and associated cross lines in said line of sight and means for supplying light from said lamp to said light screen, and an electric lighting system for said lamp including longitudinally-leveling switches at the front and rear ends of said longitudinal member and transversely leveling switches at the ends of said transverse member and electrical connections through said switches to said lamp whereby said switches will be closed when the sextant is level and the light source will be rendered effective.

FAYETTE LEISTER.
HERBERT A. LEISTER.